US010671673B2

(12) United States Patent
Boxwell et al.

(10) Patent No.: US 10,671,673 B2
(45) Date of Patent: Jun. 2, 2020

(54) ANSWERING POLAR QUESTIONS

(71) Applicant: International Business Machines Corporation, Armonk, NY (US)

(72) Inventors: Stephen A. Boxwell, Columbus, OH (US); Kyle M. Brake, Dublin, OH (US); Keith G. Frost, Delaware, OH (US); Stanley J. Vernier, Grove City, OH (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 15/815,746

(22) Filed: Nov. 17, 2017

(65) Prior Publication Data

US 2019/0155963 A1    May 23, 2019

(51) Int. Cl.
*G06F 16/30* (2019.01)
*G06F 16/903* (2019.01)
*G06F 16/2452* (2019.01)
*G06F 16/9032* (2019.01)
*G06F 40/35* (2020.01)
*G06F 40/295* (2020.01)

(52) U.S. Cl.
CPC .. *G06F 16/90335* (2019.01); *G06F 16/24522* (2019.01); *G06F 16/90332* (2019.01); *G06F 40/295* (2020.01); *G06F 40/35* (2020.01)

(58) Field of Classification Search
CPC .............. G06F 16/24522; G06F 16/90335
See application file for complete search history.

(56) References Cited

U.S. PATENT DOCUMENTS

| 7,707,023 | B2 | 4/2010 | Ejerhed | |
|---|---|---|---|---|
| 8,626,691 | B2 | 1/2014 | Hiltunen et al. | |
| 9,213,771 | B2 | 12/2015 | Chen et al. | |
| 2008/0133671 | A1* | 6/2008 | Kalaboukis | H04L 51/00 709/206 |
| 2013/0262501 | A1* | 10/2013 | Kuchmann-Beauger | G06F 16/24535 707/769 |
| 2015/0039536 | A1* | 2/2015 | Cook | G06N 5/02 706/11 |
| 2015/0371137 | A1* | 12/2015 | Giffels | G06F 16/3329 706/46 |

(Continued)

FOREIGN PATENT DOCUMENTS

WO    WO2014000764 A1    1/2014

OTHER PUBLICATIONS

Article entitled "Training IBM Watson Using Automatically Generated Question-Answer Pairs", by Lee et al., dated 2016.*

(Continued)

*Primary Examiner* — Mahesh H Dwivedi
(74) *Attorney, Agent, or Firm* — Peter J. Hackman; Brian M. Restauro

(57) ABSTRACT

Adapting a polar question to a form answerable by a non-polar question answering system. Entities are identified in the polar question. A set of non-polar questions are generated by removing an entity and using the remaining entities to form a set of questions with the removed entities as the expected answers. The set of non-polar questions are presented to a non-polar question answering system, and a set of answers are received. The set of answers are scored to determine a polar answer to the polar question.

18 Claims, 5 Drawing Sheets

(56) References Cited

U.S. PATENT DOCUMENTS

2016/0335261 A1    11/2016  Salvetti et al.
2016/0350406 A1*   12/2016  Byron ................. G06F 16/3344
2017/0039293 A1     2/2017  Kummamuru et al.
2017/0293621 A1    10/2017  Boguraev et al.
2017/0293651 A1    10/2017  Boguraev et al.
2017/0293679 A1    10/2017  Boguraev et al.

OTHER PUBLICATIONS

Hovy et al. "Using Knowledge to Facilitate Factoid Answer Pinpointing" COLING '02 Proceedings of the 19th international conference on Computational linguistics—vol. 1. pp. 1-7. Taipei, Taiwan. Aug. 24-Sep. 1, 2002.

Kanayama et al. "Answering Yes/No Questions via Question Inversion". Proceedings of COLING 2012: Technical Papers, pp. 1377-1392, COLING 2012, Mumbai, Dec. 2012. pp. 1377-1390.

* cited by examiner

US 10,671,673 B2

ANSWERING POLAR QUESTIONS

BACKGROUND OF THE INVENTION

The present invention relates generally to the field of question-answering systems, and more particularly to polar question answering.

Question answering systems allow a user to query the system with a question, and the system returns an answer. Questions are categorized as polar or non-polar. Polar questions are questions that are typically answered with "yes" or "no."

SUMMARY

According to an aspect of the present invention, there is a method, computer program product; and/or system that performs the following steps (not necessarily in the following order): (i) receiving a question presenting an exclusive disjunction; (ii) generating a plurality of responsive questions requiring factual answers; (iii) submitting a query including the plurality of responsive questions; (iv) receiving a set of factual answers corresponding to each responsive question of the plurality of responsive questions; (v) determine a polar answer based on the sets of factual answers; and (vi) reporting the polar answer. The question has natural language structure.

According to an aspect of the present invention, there is a method, computer program product, and/or system that performs the following steps (not necessarily in the following order): (i) obtaining an input; (ii) determining whether the type of input fails to be a factoid-style question; (iii) responsive to determining that the type of input fails to be a factoid-style question, extracting entities from the input, resulting in extracted entities; (iv) replacing each extracted entity with a question token; (v) generating a set of questions using the question tokens; (vi) sending the set of questions to a factoid-style question answering system; (vii) obtaining an output from the factoid-style question answering system; (viii) determining if one of the extracted entities is present in an answer from the output; (ix) responsive to one of the extracted entities being present in an answer, determining a rank associated with the answer; (x) using the rank to determine a score for the answer; (xi) adding the answer and the score to a summary; and (xii) providing the summary and passage evidence associated with the answer.

DETAILED DESCRIPTION

Figure 1:
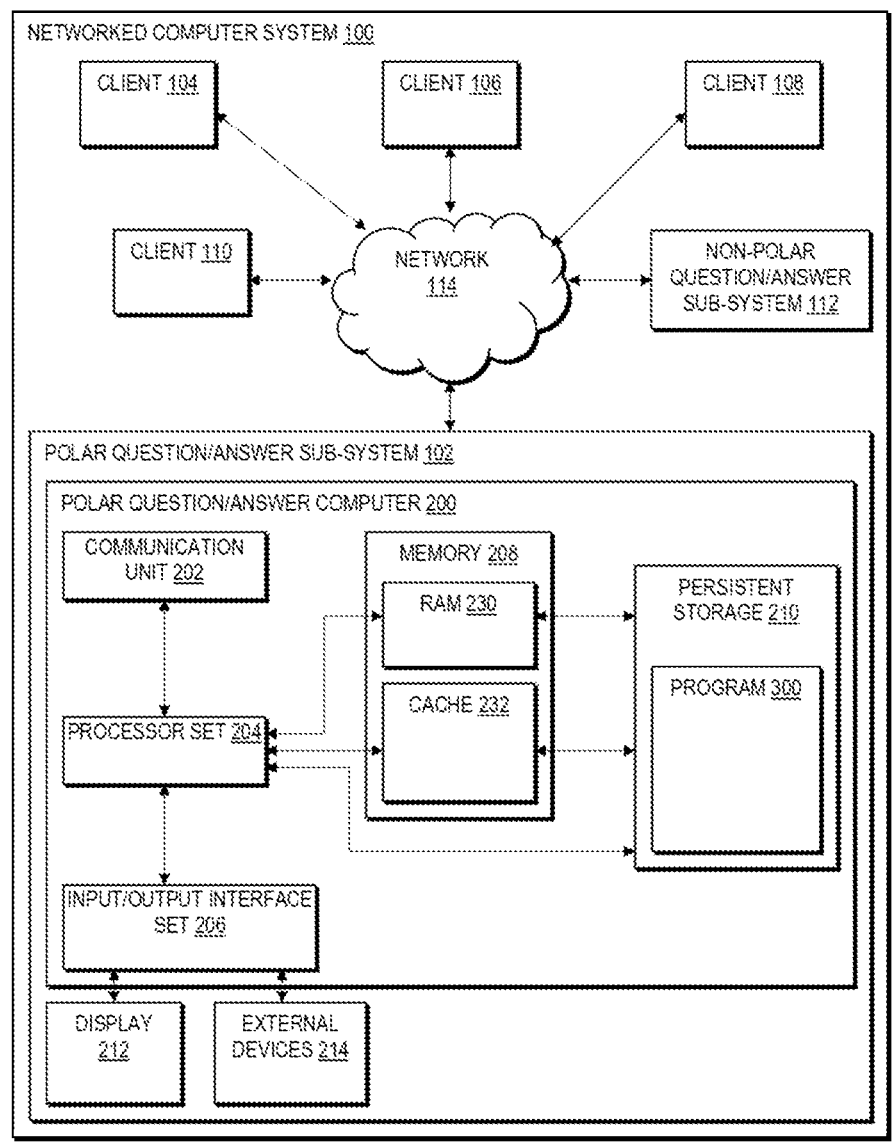
FIG. 1 is a block diagram view of a first embodiment of a system according to the present invention.

Adapting a polar question to a form answerable by a non-polar question answering system. Entities are identified in the polar question. A set of non-polar questions are generated by removing an entity and using the remaining entities to form a set of questions with the removed entities as the expected answers. The set of non-polar questions are presented to a non-polar question answering system, and a set of answers are received. The set of answers are scored to determine a polar answer to the polar question. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: polar question/answer ("Q/A") sub-system 102; client sub-systems 104, 106, 108, 110; non-polar Q/A sub-system 112; communication network 114; polar Q/A computer 200; communication unit 202; processor set 204; input/output (I/O) interface set 206; memory device 208; persistent storage device 210; display device 212; external device set 214; random access memory (RAM) devices 230; cache memory device 232; and program 300.

Non-polar Q/A sub-system 112 is a system for receiving a set of non-polar questions and returning a ranked set of answers to the non-polar questions.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Program 300 operates to receive a polar question from a user, identify entities in the polar question, generate non-polar questions from the entities, and determine, based on non-polar answers, a polar answer to the polar question. The non-polar questions are presented to a Q/A system, such as non-polar Q/A sub-system 112, and answers are received. It should be noted that generating answers to the polar question is performed by causing a conventional non-polar Q/A system to produce factual answers to related non-polar questions, thus leading program 300 to make a yes/no conclusion without querying a conventional yes-no Q/A system. The factual answers are scored to determine a polar answer to the polar question, and the polar answer is presented to the user.

Figure 2:
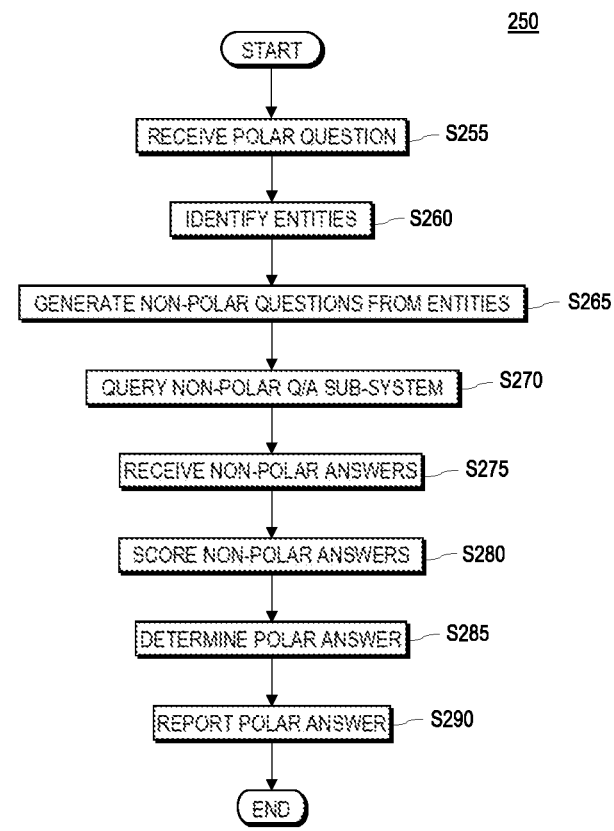
FIG. 2 is a flowchart showing a first embodiment method performed, at least in part, by the first embodiment system.
Figure 3:
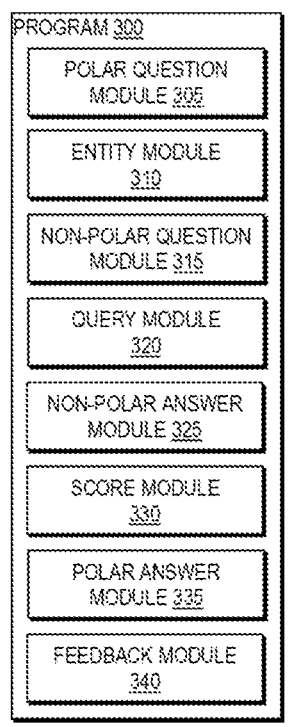
FIG. 3 is a block diagram view of a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where polar question module ("mod") 305 receives a polar question. In this embodiment, polar question mod 305 receives a question from a user in a natural language form. In a first example, polar question mod 305 receives a question "Is Earth a planet in the solar system?" from the user over network 114 (FIG. 1) via client device 104. In a second example, polar question mod 305 receives a question "Is Titan a planet in the solar system?" in the same manner. In a third example, polar question mod 305 receives a question "Is Pluto a planet in the solar system?" in yet the same manner. Some embodiments of the present invention determine, upon receipt of any question, whether or not the question received is a polar question. Some embodiments of the present invention are directed to a network attached interface to a conventional factoid-based Q/A sub-system (not shown) that filters out polar questions for additional processing, while passing along any non-polar questions that are received from clients, such as clients 104, 106, 108, and 110. Some embodiments of the present invention determine by the non-polar Q/A sub-system (such as sub-system 112) that a polar question is received and transmit the polar question to a polar Q/A sub-system (such as sub-system 102).

Processing proceeds to step S260, where entity mod 310 identifies entities in the polar question. In this embodiment, entity mod 310 identifies a plurality of entities in the polar question using natural language processing (NLP). In the first example, entity mod 310 identifies the entities "Earth," "planet," and "solar system" from the text of the question. In the second example, entity mod 310 identifies the entities "Titan," "planet," and "solar system" from the text of the question. In the third example, entity mod 310 identifies the entities "Pluto," "planet," and "solar system" from the text of the question.

Some embodiments of the present invention identify at least 3 entities from a given question. Accordingly, where only one or two entities are identified in the text of the question, entity mod 310, applies NLP techniques to identify additional entities to comply with the 3-entity requirement.

For example, the question "is Pluto a planet?" does not inherently disclose three entities within the text of the question, but only two. By employing natural language analysis to this question, the term planet is limited to planets in the Solar System. Natural language analysis is used to identify related entities and make contextual assumptions when an entity's use is ambiguous. Some embodiments of the present invention disclose to the user assumptions made or additional entities by used to determine a correct answer. In some embodiments of the present invention, where less than 3 entities are identified, the user is presented with a list of proposed additional entities for selection before a response is determined.

Processing proceeds to step S265, where non-polar question mod 315 generates non-polar questions from the entities. In this embodiment, non-polar question mod 315 removes one entity from the polar question to generate a set of questions with the remaining entities that seek the removed entity as the answer. In the first example, non-polar question mod 315 removes "Earth" to generate a question "What is a planet in the solar system?" Similarly, non-polar question mod 315 removes "planet" and "solar system" to generate questions "What is Earth in the solar system?" and "Where is Earth a planet?", respectively. In the second and third examples, non-polar question mod 315 generates similar non-polar questions regarding Titan and Pluto, respectively. Some embodiments of the present invention generate search terms instead of non-polar questions. For example, the search terms "Earth" and "planet" are generated for determining a polar answer to the polar question. Some embodiments of the present invention require at least three entities be identified from a given polar question so that at least three sets of two entities are created where one entity is missing.

Processing proceeds to step S270, where query mod 320 queries a non-polar question/answer sub-system for factual answers to the set of non-polar questions. In this embodiment, query mod 320 queries non-polar question/answer sub-system 112 for factual answers to the set of non-polar questions generated by non-polar question mod 315. Alternatively, the search terms are submitted to a search engine (not shown). In that way, search results are examined for the occurrence of the missing entity "solar system." It should be noted that the missing entity from the set of entities is the target result of the corresponding search query, whether the query includes a natural language question or is a simple string of search terms.

Processing proceeds to step S275, where non-polar answer mod 325 receives a set of non-polar answers to the set of non-polar questions. In this embodiment, non-polar answer mod 325 receives a set of ranked lists of non-polar answers from non-polar question/answer sub-system 112. For each non-polar question, several answers will be received. The ranked list is based on a pre-determined criteria, such as most common answer, most popular answer, alphabetical order, and most recently occurring answers in the searched knowledge base.

In the first example, in response to the question "What is a planet in the solar system?", non-polar answer mod 325 receives a ranked list of "Mercury, Venus, Earth, Mars, Jupiter, Saturn, Uranus, and Neptune." Similarly, in response to the questions "What is Earth in the solar system?" and "Where is Earth a planet?", non-polar answer mod 325 receives lists containing "planet" and "in the solar system," respectively. In the second example, non-polar answer mod 325 receives lists of "Mercury, Venus, Earth, Mars, Jupiter, Saturn, Uranus, and Neptune;" "moon;" and "in the solar system." In the third example, non-polar answer mod 325 receives lists of "Mercury, Venus, Earth, Mars, Jupiter, Saturn, Uranus, and Neptune;" "dwarf-planet, minor-planet, and planet;" and "in the solar system."

Processing proceeds to step S280, where score mod 330 scores the non-polar answers corresponding to a non-polar question. In this embodiment, score mod 330 scores each list of non-polar answers by the rank of the removed entity in the list. That is, when an answer list ranks a removed entity at fourth on the list, the removed entity is consider less likely to lead to a particular response than if the removed entity appeared as the first ranked on the list of answers. Some embodiments of the present invention work with a polar question as if it is seeking a true or false type of response, so the analysis is directed to "is this true?" and upon determining the polar question presents a true statement, the answer is given, "yes." In the first example, score mod 330 assigns a score of ⅓ to the first list, a score of 1 to the second list, and a score of 1 to the third list. In the second example, score mod 330 assigns scores of 0, 0, and 1 to the lists, respectively. In the third example, score mod 330 assigs scores of 0, ⅓, and 1 to the lists, respectively.

Processing proceeds to step S285, where polar answer mod 335, determines a polar answer to the polar question received by polar question mod 305. In this embodiment, polar answer mod 335 determines a polar answer based on the average score of the lists of answers. In the first example, polar answer mod 335 determines the average score to be ⅞, or 78%, and polar answer mod 335 determines that the polar answer is "yes." As stated above, some embodiments determine the likelihood that the answer is yes. Here, the likelihood is 78%, so the polar answer mod answers "yes." In the second example, polar answer mod 335 determines the average score to be ⅓, or 33%, and polar answer mod 335 determines that the polar answer is "no." In the third example, polar answer mod 335 determines the average score to be 4/9, or 44%, and polar answer mod 335 determines that the polar answer in "no."

In some embodiments of the present invention, polar answer mod 335 additionally determines a confidence score by determining whether multiple non-polar answer lists cite the same reference as the answer. For example, where all lists cite the same reference as the answer, polar answer mod 335 assigns a high confidence to the polar answer. In an alternate example, where each list cites a different reference as the answer, polar answer mod 335 assigns a low confidence to the polar answer.

Processing proceeds to step S290, where feedback mod 340 reports the polar answer. In this embodiment, feedback mod 340 sends the polar answer to the user over network 114 (FIG. 1) to client 104. In the first example, feedback mod 340 sends an answer of "yes" to the user as a response to the question "Is Earth a planet in the solar system?" In the second and third examples, feedback mod 34 sends an answer of "no" to the user. Additionally, some embodiments of the present invention include a confidence indicator with the answer.

III. Further Comments and/or Embodiments

Some embodiments of the present invention recognize the following facts, potential problems and/or potential areas for improvement with respect to the current state of the art: (i) polar questions are difficult for conventional factoid-based Q/A systems; (ii) conventional polar Q/A systems are costly and often misunderstand the polar question; and/or (ii)

factoid-based answering systems work in-part by filling candidate answers into the question word ("focus").

Figure 4:
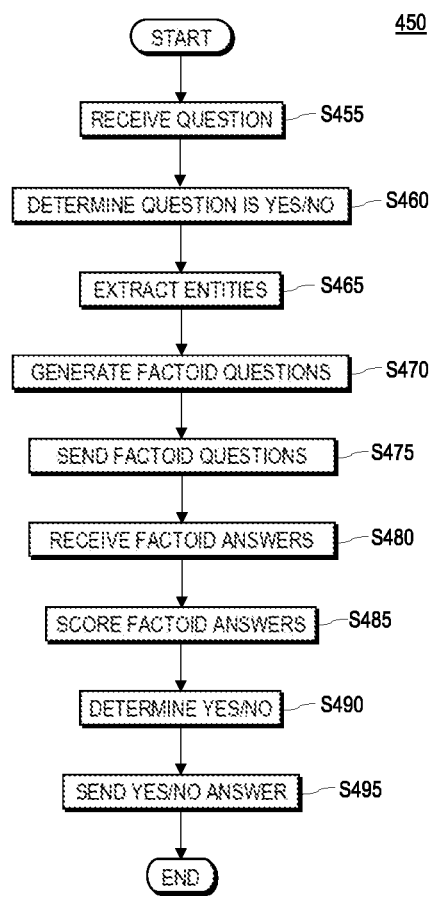
FIG. 4 is a flowchart showing a second embodiment method.
Figure 5:
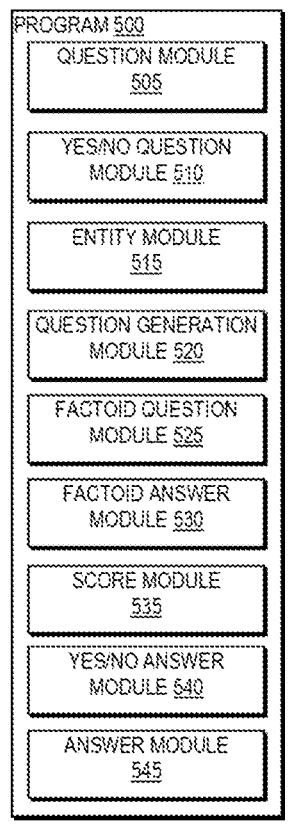
FIG. 5 is a block diagram view of machine logic (for example, software) portion of a second embodiment system.

Further embodiments of the present invention are discussed in the paragraphs that follow with reference to FIGS. 4 and 5.

FIG. 4 shows flowchart 450 depicting a second embodiment method, performed on a system (not shown) similar to networked computer system 100, according to the present invention. FIG. 5 shows program 500 for performing at least some of the method steps of flowchart 400. This method will now be discussed, over the course of the following paragraphs, with extensive reference to FIG. 4 (for the method step blocks) and FIG. 5 (for the software blocks).

Processing begins at step S455, where question mod 505 receives a question. In this embodiment, question mod 505 receives a question from a user. For example, question mod 505 receives a question, "Is Earth a planet in the solar system?" In this example, the polar Q/A sub-system, such as sub-system 102 receives the question as an interface to a factoid-based Q/A sub-system (not shown) connected as an external device, such as device 214 (FIG. 1). In this way, all question received from various clients are filtered by the polar Q/A sub-system.

Processing proceeds to step S460, where yes/no question mod 510 determines that the question is a yes/no question. In the example, yes/no question mod 510 determines that "Is Earth a planet in the solar system?" requires "yes" or "no" as an answer. For question determined to be factual questions, the question is submitted directly to the attached polar Q/A sub-system.

Processing proceeds to step S465, where entity mod 515 extracts entities from the question. In the example and responsive to the determination that the question received is a yes/no question, entity mod 515 extracts the entities "Earth," "planet," and "solar system" from the question. Similar to the discussion above, multiple entities are extracted from the presented question so that factual question may be created that target one of the extracted entities as a response. Some embodiments of the present invention target multiple missing entities with each factual question including only a subset of extracted entities.

Processing proceeds to step S470, where question generation mod 520 generates factoid questions. In this embodiment, factoid question mod 520 generates factoid-based questions by removing one entity from the user question and generating a factoid-based question using the remaining entities. Alternatively, several entities are identified by entity mod 515 and only some entities are included in each factoid-based question rather than all remaining entities after one entity is removed. In the example, question generation mod 520 removes "Earth," "planet," and "solar system" from the user question to generate a set of factoid questions "What is a planet in the solar system?", "What is Earth in the solar system?", and "Where is Earth a planet?", respectively.

Processing proceeds to step S475, where factoid question mod 525 sends the factoid questions to the factoid-based Q/A sub-system. In the example, factoid question mod 525 sends the set of factoid questions generated by the question generation mod to the factoid-based Q/A sub-system seeking responsive fact lists associated with each factoid question.

Processing proceeds to step S480, where factoid answer mod 530 receives factoid multiple answers from the factoid-based Q/A system in response to the set of factoid questions. Each factoid question is responded to with a list of ranked answers for a single factoid question. In this embodiment, factoid answer mod 530 receives a list of potential answers for each questions, ranked by the likelihood that the answer is correct. In the example, for the question "What is a planet in the solar system?", factoid answer mod 530 receives a list of answers containing "(1) Mercury," "(2) Venus," "(3) Earth," "(4) Mars," "(5) Jupiter," "(6) Saturn," "(7) Uranus," and "(8) Neptune." In the example, factoid answer mod 530 receives an answer list for "What is Earth in the solar system?" containing "planet" as one of the ranked answers, specifically ranked first, and factoid answer mod 530 receives an answer list for "Where is Earth a planet?" containing "in the solar system" as one of the ranked answers, specifically ranked first. It should be noted that the ranking of the listed answers is based on a pre-determined order and may be programmed by the user seeking the answer, by policy for the operation of the polar Q/A sub-system, or by other administrative action prior to or in conjunction with receipt of the polar question.

Processing proceeds to step S485, where score mod 535 scores the factoid answers according to the ranked lists. In this embodiment, score mod 535 assigns a fractional score based on the rank of the removed entity in the factoid answer list. In the example, score mod 535 assigns a score of ⅓ to the first answer list, a score of 1 to the second list, and a score of 1 to the third list.

Processing proceeds to step S490, where yes/no mod 540 determines whether the answer is "yes" or "no." In this embodiment, yes/no mod 540 determines the answer based on the average score of the factoid answer lists. In the example, yes/no mod 540 averages the scores of the lists to achieve a yes score of ⅞ or 78%.

Processing proceeds to step S495, where answer mod 545 sends the yes/no answer. In this embodiment, answer mod 545 sends the yes/no answer to the user. In the example, for the question "Is Earth a planet in the solar system?", answer mod 545 sends an answer of "yes" to the user.

Some embodiments of the present invention may include one, or more, of the following features, characteristics and/or advantages: (i) converts polar questions to sets of non-polar questions that can be easily handled by a conventional factoid-based Q/A program; (ii) iteratively replacing words in a polar question with foci; (iii) receives a plurality of potential answers ranked according a pre-determined criteria; (iv) inspects potential answers to see if a removed entity is present as an answer in the plurality of potential answers; (v) inspects potential answers to determine a score of removed entity; (vi) evaluates support for generated questions by evaluating consistency of cited passages across generated questions; (vii) determines if the same passage is returned for all generated questions, supporting the truth of the underlying yes/no question; and/or (vii) increases confidence level of a yes/no answer based on the same passage being cited for multiple generated questions.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Polar question: a yes/no question; a question presenting an exclusive disjunction; and/or a question with a pair of alternatives of which only one is acceptable as an answer.

Exclusive disjunction: exclusive or; a pair of alternatives; XOR; A or B, but not A and B.

Non-polar question: an open question, typically requiring a statement as an answer; and/or wh-question (who, what, when, where, and how question).

Factoid question: another name for a non-polar question, see definition of "non-polar question" above.

What is claimed is:

1. A computer-implemented method comprising:
   receiving a question presenting an exclusive disjunction, wherein the question has less than three entities and has natural language structure;
   in response to identifying less than three entities in the question, generating additional entities for consideration;
   generating a plurality of responsive questions requiring factual answers from a removed entity of at least three entities identified in the question and contextual information in the question;
   submitting a query including the plurality of responsive questions;
   receiving a set of factual answers for each responsive question of the plurality of responsive questions;
   determining a polar answer based on the set of factual answers, wherein the set of factual answers is ranked according to a position of the removed entity in the set of factual answers; and
   reporting the polar answer.

2. The computer-implemented method of claim 1, further comprising:
   identifying a plurality of entities in the question, and
   generating the plurality of responsive questions based on the question and the plurality of entities.

3. The computer-implemented method of claim 2, wherein generating the plurality of responsive questions, further comprises:
   generating a first subset of entities by removing a first entity from the plurality of entities;
   forming a responsive question based on the first subset of entities, wherein the responsive question targets the first entity as a factual answer.

4. The computer-implemented method of claim 3, further comprising:
   determining a confidence level of the polar answer based on a removed entity repeatedly occurring as a factual answer in the set of factual answers.

5. The computer-implemented method of claim 1, further comprising:
   assigning scores to individual factual answers in the set of factual answers;
   wherein:
   determining the polar answer is further based on the scores assigned to the individual factual answers.

6. The computer-implemented method of claim 1, further comprising:
   determining whether the question presents an exclusive disjunction; and
   the generating a plurality of responsive questions is performed responsive to determining that the question presents an exclusive disjunction.

7. A computer program product comprising a computer readable storage media having stored thereon:
   program instructions to receive a question presenting an exclusive disjunction, wherein the question has less than three entities and has natural language structure;
   program instructions to, in response to identifying less than three entities in the question, generating additional entities for consideration;
   program instructions to generate a plurality of responsive questions requiring factual answers from a removed entity of at least three entities identified in the question and contextual information in the question;
   program instructions to submit a query including the plurality of responsive questions;
   program instructions to receive a set of factual answers for each responsive question of the plurality of responsive questions;
   program instructions to determine a polar answer based on the set of factual answers, wherein the set of factual answers is ranked according to a position of the removed entity in the set of factual answers; and
   program instructions to report the polar answer.

8. The computer program product of claim 7, further comprising:
   program instructions to identify a plurality of entities in the question, and
   program instructions to generate the plurality of responsive questions based on the question and the plurality of entities.

9. The computer program product of claim 8, wherein the program instructions to generate the plurality of responsive questions, further comprises:
   program instructions to generate a first subset of entities by removing a first entity from the plurality of entities;
   program instructions to form a responsive question based on the first subset of entities, wherein the responsive question targets the first entity as a factual answer.

10. The computer program product of claim 9, further comprising:
    program instructions to determine a confidence level of the polar answer based on a removed entity repeatedly occurring as a factual answer in the set of factual answers.

11. The computer program product of claim 7, further comprising:
   program instructions to assign scores to individual factual answers in the set of factual answers;
   wherein:
   the program instruction to determine the polar answer is further based on the scores assigned to the individual factual answers.

12. The computer program product of claim 7, further comprising:
   program instructions to determine whether the question presents an exclusive disjunction; and
   the program instructions to generate a plurality of responsive questions is performed responsive to determining that the question presents an exclusive disjunction.

13. A computer system comprising:
   a processor set; and
   a computer readable storage media;
   wherein:
   the processor set is structured, located, connected, and/or programmed to execute program instructions stored on the computer readable storage media; and
   the program instructions include:
   program instructions to receive a question presenting an exclusive disjunction, wherein the question has less than three entities and has natural language structure;
   program instructions to, in response to identifying less than three entities in the question, generating additional entities for consideration;
   program instructions to generate a plurality of responsive questions requiring factual answers from a removed entity of at least three entities identified in the question and contextual information in the question;
   program instructions to submit a query including the plurality of responsive questions;
   program instructions to receive a set of factual answers for each responsive question of the plurality of responsive questions;
   program instructions to determine a polar answer based on the set of factual answers, wherein the set of factual answers is ranked according to a position of the removed entity in the set of factual answers; and
   program instructions to report the polar answer.

14. The computer system of claim 13, further comprising:
   program instructions to identify a plurality of entities in the question, and
   program instructions to generate the plurality of responsive questions based on the question and the plurality of entities.

15. The computer system of claim 14, wherein the program instructions to generate the plurality of responsive questions, further comprises:
   program instructions to generate a first subset of entities by removing a first entity from the plurality of entities;
   program instructions to form a responsive question based on the first subset of entities, wherein the responsive question targets the first entity as a factual answer.

16. The computer system of claim 15, further comprising:
   program instructions to determine a confidence level of the polar answer based on a removed entity repeatedly occurring as a factual answer in the set of factual answers.

17. The computer system of claim 13, further comprising:
   program instructions to assign scores to individual factual answers in the set of factual answers;
   wherein:
   the program instruction to determine the polar answer is further based on the scores assigned to the individual factual answers.

18. The computer system of claim 13, further comprising:
   program instructions to determine whether the question presents an exclusive disjunction; and
   the program instructions to generate a plurality of responsive questions is performed responsive to determining that the question presents an exclusive disjunction.

* * * * *